(12) United States Patent
Huang et al.

(10) Patent No.: US 11,114,931 B2
(45) Date of Patent: *Sep. 7, 2021

(54) AC-DC POWER CONVERTER

(71) Applicant: Silergy Semiconductor Technology (Hangzhou) LTD, Hangzhou (CN)

(72) Inventors: Qiukai Huang, Hangzhou (CN); Jian Deng, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 51 days.

This patent is subject to a terminal disclaimer.

(21) Appl. No.: 16/594,287

(22) Filed: Oct. 7, 2019

(65) Prior Publication Data

US 2020/0127553 A1    Apr. 23, 2020

(30) Foreign Application Priority Data

Oct. 18, 2018   (CN) .......................... 201811215138.8

(51) Int. Cl.
| | |
|---|---|
| *H02M 1/14* | (2006.01) |
| *H02M 7/04* | (2006.01) |
| *H02M 7/217* | (2006.01) |

(52) U.S. Cl.
CPC .............. *H02M 1/14* (2013.01); *H02M 7/043* (2013.01); *H02M 7/217* (2013.01)

(58) Field of Classification Search
CPC .......... H02M 1/14; H02M 1/15; H02M 7/043; H02M 7/02; H02M 7/217; H02M 7/00; H02M 7/21; H02M 7/12
See application file for complete search history.

(56) References Cited

U.S. PATENT DOCUMENTS

| | | |
|---|---|---|
| 6,005,780 A | 12/1999 | Hua |
| 6,580,258 B2 | 6/2003 | Wilcox et al. |
| 9,325,254 B2 | 4/2016 | Deng et al. |
| 9,331,588 B2 | 5/2016 | Chen |
| 9,444,353 B2 * | 9/2016 | Huang ................... H02M 1/32 |
| 9,488,680 B2 | 11/2016 | Xu |
| 2014/0049990 A1 * | 2/2014 | Limpaecher ...... H02M 3/33584 363/15 |
| 2014/0078789 A1 | 3/2014 | Li et al. |
| 2014/0239934 A1 | 8/2014 | Zhang |
| 2015/0160270 A1 | 6/2015 | Shi et al. |
| 2015/0280578 A1 | 10/2015 | Huang et al. |

FOREIGN PATENT DOCUMENTS

CN          203590024 U     5/2014

* cited by examiner

*Primary Examiner* — Adolf D Berhane
(74) *Attorney, Agent, or Firm* — Michael C. Stephens, Jr.

(57) ABSTRACT

An AC-DC power converter can include: a front-stage power circuit; a rear-stage power circuit configured to share one power switch as a main power switch with the front-stage power circuit, where the rear-stage power circuit is coupled to a load, and a first magnetic component of the front-stage power circuit and a second magnetic component of the rear-stage power circuit are not coupled in one conductive loop from a positive terminal of a DC input voltage to a negative terminal of the DC input voltage; and an energy storage capacitor coupled to the front-stage power circuit and the rear-stage power circuit, where a common node of the first and second magnetic components is directly coupled to the power switch.

14 Claims, 3 Drawing Sheets

AC-DC POWER CONVERTER

RELATED APPLICATIONS

This application claims the benefit of Chinese Patent Application No. 201811215138.8, filed on Oct. 18, 2018, which is incorporated herein by reference in its entirety.

FIELD OF THE INVENTION

The present invention generally relates to the field of power electronics, and more particularly to AC-DC power converters.

BACKGROUND

A switched-mode power supply (SMPS), or a "switching" power supply, can include a power stage circuit and a control circuit. When there is an input voltage, the control circuit can consider internal parameters and external load changes, and may regulate the on/off times of the switch system in the power stage circuit. Switching power supplies have a wide variety of applications in modern electronics. For example, switching power supplies can be used to drive light-emitting diode (LED) loads.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

An AC-DC power converter can convert AC voltage into a constant DC signal (e.g., DC voltage or DC current). AC-DC power converters are widely used to drive high-power loads (e.g., motors, light-emitting diode [LED] lamps, etc.). An AC-DC power converter usually includes a rectifier bridge that converts the external AC voltage into a sinusoidal half-wave DC input voltage to be supplied to a subsequent conversion circuit. In order to reduce harmonic pollution to the AC power grid, the AC-DC power converter may utilize a power factor correction (PFC) circuit to realize a power factor correction function and to obtain a higher power factor (PF). The AC-DC power converter can apply a two-stage conversion circuit or a single-stage conversion circuit, in order to realize the power factor correction function and 2 obtain a constant output signal. However, the two-stage conversion circuit (e.g., a PFC circuit and a DC/DC circuit) scheme has more devices and more complex control, and the voltage across the energy storage capacitor in the single-stage conversion circuit scheme can be relatively high, causing higher power device costs.

In one embodiment, an AC-DC power converter can include: (i) a front-stage power circuit; (ii) a rear-stage power circuit configured to share one power switch as a main power switch with the front-stage power circuit, where the rear-stage power circuit is coupled to a load, and a first magnetic component of the front-stage power circuit and a second magnetic component of the rear-stage power circuit are not coupled in one conductive loop from a positive terminal of a DC input voltage to a negative terminal of the DC input voltage; and (iii) an energy storage capacitor coupled to the front-stage power circuit and the rear-stage power circuit, where a common node of the first and second magnetic components is directly coupled to the power switch.

Figure 1:
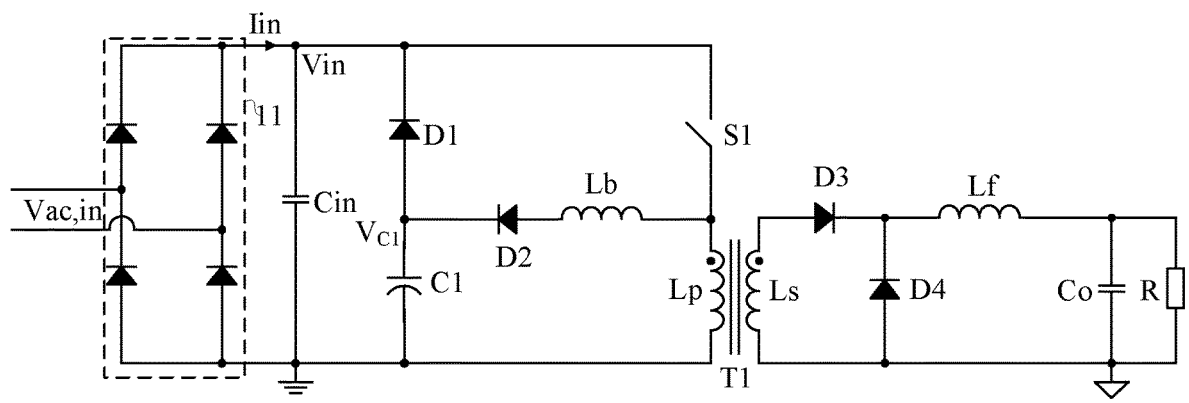
FIG. 1 is a schematic block diagram of a first example AC-DC power converter, in accordance with embodiments of the present invention.

Referring now to FIG. 1, shown is a schematic block diagram of a first example AC-DC power converter, in accordance with embodiments of the present invention. In this particular example, external AC voltage Vac,in can be rectified and filtered by rectifier circuit 11 and filter capacitor Cin to obtain a sinusoidal half-wave DC input voltage Vin. The AC-DC power converter can include energy storage capacitor C1, a front-stage power circuit, and a rear-stage power circuit. The front-stage power circuit and the rear-stage power circuit may share power switch S1 as a common main power switch, and load R can be coupled with the rear-stage power circuit. Also, a first magnetic component of the front-stage power circuit and a second inductive element of the rear-stage power circuit may not be coupled in series in one conductive loop from a positive terminal of a DC input voltage to a negative terminal of the DC input voltage.

Power switch S1 can be directly coupled (e.g., directly connected with no other components therebetween) to the common node of the first magnetic component and the second magnetic component. Since the front-stage and the rear-stage power circuits may share one power switch, the AC-DC power converter can be referred to as a single-stage power converter. Energy storage capacitor C1 can be coupled to the front-stage power circuit and the rear-stage power circuit, and may be coupled in the loop of the front-stage power circuit. Moreover, energy storage capacitor C1 can be charged when the front-stage power circuit is in an energy storage state and in a freewheeling state. When DC input voltage Vin is less than voltage $V_{C1}$ on energy storage capacitor C1, the power supplied to load R may be provided by energy storage capacitor C1.

In particular embodiments, when DC input voltage Vin is greater than voltage $V_{C1}$ on energy storage capacitor C1, DC input voltage Vin can supply power to the front-stage power circuit and the rear-stage power circuit. That is, the front-stage power circuit and the rear-stage power circuit may both operate at the same time. In each switching period, at least part of the energy provided by the DC input voltage of the AC-DC power converter can be directly transferred to load R through one power conversion of the rear-stage power circuit. When the front-stage power circuit operates, energy storage capacitor C1 may be charged through the loop of the front-stage power circuit. When DC input voltage Vin is less than voltage $V_{C1}$ on energy storage capacitor C1, the rear-stage power circuit can supply power to load R by the energy discharged by energy storage capacitor C1, and the front-stage power circuit may not operate, or DC input voltage Vin can supply power to the front-stage power circuit. In this particular example, the front-stage power circuit may not operate.

The AC-DC power converter can include diode D1. An anode of diode D1 can connect to a positive electrode of energy storage capacitor C1, a cathode of diode D1 can connect to a first output terminal of rectifier circuit 11, and a second output terminal of rectifier circuit 11 may be grounded. Power switch S1 can connect to the cathode of diode D1. In this example, the front-stage power circuit is a buck circuit. Here, the "first" magnetic component refers to inductor Lb, and a "second" inductive element refers to transformer T1.

For example, the front-stage power circuit can include inductor Lb having one terminal connected to the first terminal of power switch S1 and the other terminal connected to an anode of diode D2, while a cathode of diode D2 can connect to the positive electrode of energy storage capacitor C1. The second terminal of power switch S1 can connect to the first output terminal of rectifier circuit 11. That is, the cathode of diode D1, and a negative electrode of energy storage capacitor C1 may be connected to ground.

The rear-stage power circuit can include transformer T1, diode D3, diode D4, inductor Lf, and also may include output capacitor Co, and load R coupled to the output terminals of the rear-stage power circuit. For example, a first terminal of primary winding Lp of transformer T1 can connect to a common node of power switch S1 and inductor Lb, and a second terminal of primary winding Lp can connect to ground. An anode of diode D3 can connect to one terminal of secondary winding Ls of transformer T1, a cathode of diode D3 can connect to a cathode of diode D4, and an anode of diode D4 can connect to the other terminal of secondary winding Ls (e.g., a secondary ground that is at a different ground potential than that of the front-stage power circuit). One terminal of inductor Lf can connect to a common node of diodes D3 and D4, and the other terminal of inductor Lf can connect to output capacitor Co. In this example, power switch S1, transformer T1, diode D3, diode D4, and inductor Lf may form a forward circuit.

When DC input voltage Vin is greater than voltage $V_{C1}$ on energy storage capacitor C1, a first path can be formed by power switch S1, inductor Lb, and diode D2, thereby forming a buck circuit. Also, a second path may be formed by power switch S1, transformer T1, diode D3, diode D4, and inductor Lf, thereby forming a forward circuit. When power switch S1 is turned on, DC input voltage Vin can provide energy for inductor Lb and may charge energy storage capacitor C1 through the first path. Energy storage capacitor C1 can be in an energy storage state. At the same time, DC input voltage Vin can also provide energy for primary winding Lp of transformer T1 through the second path, such that a voltage may be generated on secondary winding Ls of transformer T1 to supply power to load R. When power switch S1 is turned off, inductor Lb in the first path may demagnetize through energy storage capacitor C1 and transformer T1 to release the energy to charge energy storage capacitor C1. Thus, energy storage capacitor C1 can remain in the energy storage state during this period. Meanwhile, the energy stored in inductor Lf may also be released to load R.

When DC input voltage Vin is less than voltage $V_{C1}$ on energy storage capacitor C1, a third path may be formed by energy storage capacitor C1, diode D1, power switch S1, transformer T1, diode D3, diode D4, and inductor Lf. When power switch S1 is turned on, primary winding Lp of transformer T1 can store energy provided by energy storage capacitor C1 through the third path. At this time, energy storage capacitor C1 may be in a discharging state. Meanwhile, a voltage can be generated on secondary winding Ls to supply power for load R. During this period, input current Iin may be zero, and the buck topology of the front-stage circuit may not operate. When power switch S1 is turned off, the energy stored in inductor Lf can be released to load R.

In one example, the AC-DC power converter can also include a control circuit, and the control circuit can control the on/off states of power switch S1. In particular embodiments, the AC-DC power converter can realize power transmission by only one power switch and a control circuit. In addition, when DC input voltage Vin is greater than voltage $V_{C1}$ on energy storage capacitor C1, energy storage capacitor C1 can be charged by the front-stage power circuit, and at least part of the energy provided by the DC input voltage may be directly transferred to load R after one power conversion of the rear-stage power circuit. When DC input voltage Vin is less than voltage $V_{C1}$ on energy storage capacitor C1, the rear-stage power circuit can supply power to load R by the energy discharged by energy storage capacitor C1, such that the AC-DC power converter has advantages of relatively low output ripple, high energy conversion efficiency, low device stress and the like, and the PF of the AC-DC power converter can be optimized.

Figure 2:
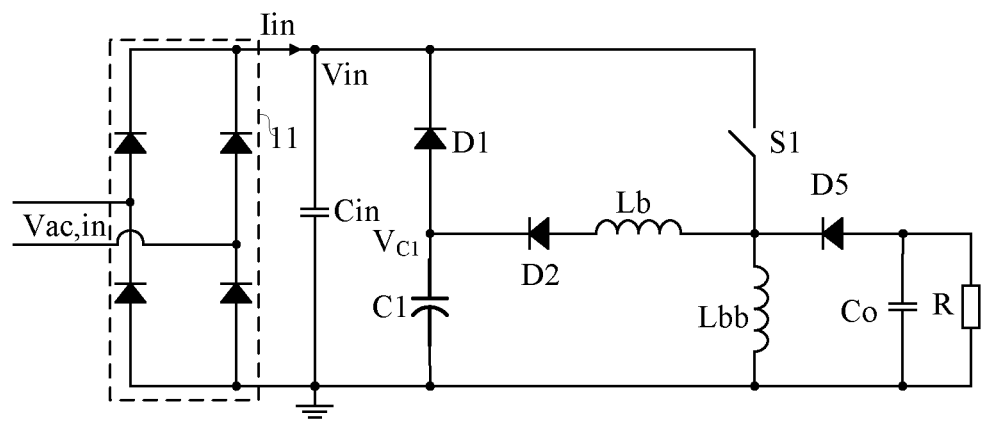
FIG. 2 is a schematic block diagram of a second example AC-DC power converter, in accordance with embodiments of the present invention.

Referring now to FIG. 2, shown is a schematic block diagram of a second example AC-DC power converter, in accordance with embodiments of the present invention. In this particular example, the "first" magnetic component is inductor Lb, and the "second" magnetic component is inductor Lbb. For example, the rear-stage power circuit can include inductor Lbb, diode D5, and may also include output capacitor Co and load R coupled to the output terminals of rear-stage power circuit. For example, a first terminal of inductor Lbb can connect to a common node of power switch S1 and inductor Lb, and a second terminal of inductor Lbb can connect to ground. A cathode of diode D5 can connect to a common node of inductor Lbb and power switch S1, and an anode of diode D5 can connect to output capacitor Co. Here, power switch S1, inductor Lbb, and diode D5 may form a buck-boost circuit.

When DC input voltage Vin is greater than voltage $V_{C1}$ on energy storage capacitor C1, a first path may be formed by power switch S1, inductor Lb, and diode D2, thereby forming a buck circuit. Also, a second path may be formed by power switch S1, inductor Lbb, and diode D5, thereby forming a buck-boost circuit. When power switch S1 is turned on, DC input voltage Vin may provide energy for inductor Lb, and can charge energy storage capacitor C1 through the first path. Energy storage capacitor C1 may be in an energy storage state. At the same time, DC input voltage Vin can also provide energy for inductor Lbb through the second path. When power switch S1 is turned off, inductor Lb in the first path may demagnetize through energy storage capacitor C1 and inductor Lbb to release the energy to energy storage capacitor C1. That is, energy storage capacitor C1 can remain in the energy storage state during this period. Meanwhile, the energy stored in inductor Lbb may be released to load R.

When DC input voltage Vin is less than voltage $V_{C1}$ on energy storage capacitor C1, a third path may be formed by energy storage capacitor C1, diode D1, power switch S1, inductor Lbb, and diode D5. When power switch S1 is turned on, inductor Lbb can store energy provided by energy storage capacitor C1 through the third path. At this time, energy storage capacitor C1 may be in a discharging state. During this period, the buck circuit of the front-stage circuit may not operate. When power switch S1 is turned off, the energy stored in inductor Lbb can be released to load R.

Figure 3:
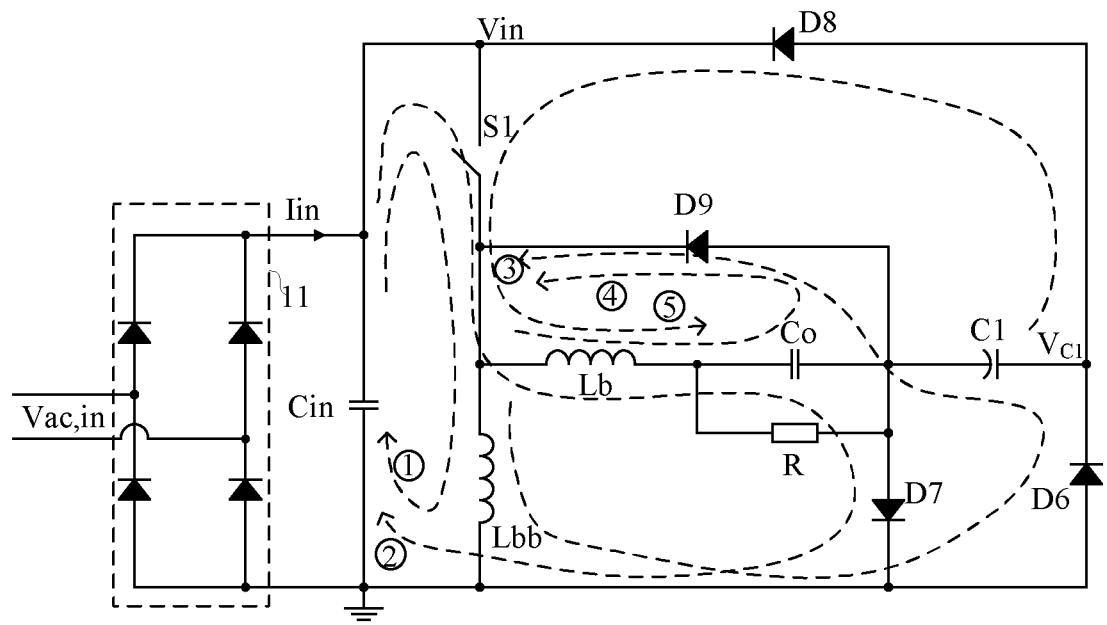
FIG. 3 is a schematic block diagram of a third example AC-DC power converter, in accordance with embodiments of the present invention.

Referring now to FIG. 3, shown is a schematic block diagram of a third example AC-DC power converter, in accordance with embodiments of the present invention. In this example, the "first" magnetic component is inductor Lbb, and the "second" magnetic component is inductor Lb. When DC input voltage Vin is greater than voltage $V_{C1}$ on energy storage capacitor C1, and if power switch S1 is turned on, the front-stage power circuit and the rear-stage power circuit may both be in the operation state. DC input voltage Vin can supply power to the front-stage power circuit and the rear-stage power circuit. During this period, if power switch S1 is turned off, the AC-DC power converter can charge energy storage capacitor C1 through the freewheeling loop of the front-stage power circuit, and the rear-stage power circuit may directly transfer part of the energy provided by DC input voltage Vin to load R through one power conversion. Further, the front-stage power circuit and the rear-stage power circuit can both be in the freewheeling state. When DC input voltage Vin is less than voltage $V_{C1}$ on energy storage capacitor C1, and if power switch S1 is turned on, DC input voltage Vin may supply power to the front-stage power circuit, and energy storage capacitor C1 can supply power to the rear-stage power circuit. At this time, both the front-stage power circuit and the rear-stage power circuit can be in the operation state. If power switch S1 is turned off, the front-stage power circuit and the rear-stage power circuit may both be in the freewheeling state at the same time.

For example, the front-stage power circuit can include inductor Lbb and diode D6. Inductor Lbb may form a first loop with power switch S1, filter capacitor Cin, and DC input voltage Vin, and can store energy provided by DC input voltage Vin through the first loop. A cathode of diode D6 can connect with the positive electrode of energy storage capacitor C1, and an anode of diode D6 can connect to ground. Inductor Lbb may discharge through diode D6.

The rear-stage power circuit can include inductor Lb, diode D7, and diode D8, and may further include output capacitor Co and load R coupled to the output terminals of the rear-stage power circuit. One terminal of inductor Lb can connect to power switch S1, the other terminal of inductor Lb can connect to an anode of diode D7 through load R, and a cathode of diode D7 can connect to ground. Diode D7 may provide a loop for inductor Lb to store energy provided by DC input voltage Vin. An anode of diode D8 can connect to the positive electrode of energy storage capacitor C1, and a cathode of diode D8 can connect to power switch S1. Diode D8 may provide a loop for inductor Lb to store energy provided by energy storage capacitor C1 when DC input voltage Vin is less than voltage $V_{C1}$ on energy storage capacitor C1.

In this example, when DC input voltage Vin is greater than voltage $V_{C1}$ on energy storage capacitor C1, and when power switch S1 is turned on, the first loop formed by inductor Lbb, power switch S1, and filter capacitor Cin can conduct, such that inductor Lbb may store energy provided by DC input voltage Vin through the first loop. At the same time, a second loop formed by inductor Lb, power switch S1, filter capacitor Cin, diode D7, and load R can also conduct, such that inductor Lb may store energy provided by DC input voltage Vin through the second loop. When power switch S1 is turned off, inductor Lbb can demagnetize and release the energy to charge energy storage capacitor C1 through a third loop formed by inductor Lbb, diode D6, energy storage capacitor C1, and diode D9. That is, energy storage capacitor C1 may be in an energy storage state. At the same time, inductor Lb can also release the energy to load R through a fourth loop formed by inductor Lb, diode D9, and load R.

When DC input voltage Vin is less than voltage $V_{C1}$ on energy storage capacitor C1, and when power switch S1 is turned on, the first loop formed by inductor Lbb, power switch S1, and filter capacitor Cin can conduct, such that inductor Lbb may store energy provided by DC input voltage Vin through the first loop. At the same time, a fifth loop formed by diode D8, power switch S1, inductor Lb, load R, and energy storage capacitor C1 can also conduct, such that inductor Lb can store energy provided by energy storage capacitor C1 through the fifth loop, thereby addressing the problem of large ripple of the output voltage or the output current that may be caused by large change of the input voltage. When power switch S1 is turned off, inductor Lbb can demagnetize and release energy to charge energy storage capacitor C1 through the third loop formed by inductor Lbb, diode D6, energy storage capacitor C1, and diode D9. That is, energy storage capacitor C1 may be in an energy storage state. Meanwhile, inductor Lb can also release the energy to load R through the fourth loop formed by inductor Lb, diode D9, and load R.

In particular embodiments, the AC-DC power converter can realize power transmission by only one power switch and a control circuit. In addition, when DC input voltage Vin is greater than voltage $V_{C1}$ on energy storage capacitor C1, energy storage capacitor C1 can be charged by the front-stage power circuit, and at least part of the energy provided by the DC input voltage may be directly transferred to load R after one power conversion of the rear-stage power circuit. When DC input voltage Vin is less than voltage $V_{C1}$ on energy storage capacitor C1, the rear-stage power circuit can supply power to load R through the energy discharged by energy storage capacitor C1, such that the AC-DC power converter has advantages of relatively low output ripple, high energy conversion efficiency, low device stress, and the like. Meanwhile, the AC-DC power converter has characteristics that the peak current of the power switch increases with the input voltage, such that the average input current approximately follows the input voltage, and the input current has no dead zone, thereby optimizing the PF of the AC-DC power converter.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. An AC-DC power converter, comprising:
   a) a front-stage power circuit;
   b) a rear-stage power circuit configured to share one power switch as a main power switch with the front-stage power circuit, wherein the rear-stage power circuit is coupled to a load, and a first magnetic component of the front-stage power circuit and a second magnetic component of the rear-stage power circuit are not coupled in one conductive loop from a positive terminal of a DC input voltage to a negative terminal of the DC input voltage; and c) an energy storage capacitor coupled to the front-stage power circuit and the rear-stage power circuit, wherein a common node of the first and second magnetic components is directly connected to the power switch with no other components therebetween.

2. The AC-DC power converter of claim 1, wherein when the DC input voltage is greater than a voltage on the energy storage capacitor, at least part of energy provided by the DC input voltage is directly transferred to the load through one power conversion of the rear-stage power circuit in each switching period.

3. The AC-DC power converter of claim 1, wherein when the power switch is turned on, the first magnetic component stores energy provided by the DC input voltage, and simultaneously the second magnetic component stores energy provided by at least one of the DC input voltage and the energy storage capacitor.

4. The AC-DC power converter of claim 2, wherein the energy storage capacitor is charged by the front-stage power circuit, and when the DC input voltage is less than the voltage on the energy storage capacitor, the rear-stage power circuit supplies energy to the load at least by the energy discharged by the energy storage capacitor.

5. The AC-DC power converter of claim 2, wherein when the DC input voltage is greater than the voltage on the energy storage capacitor, the DC input voltage supplies power to the front-stage power circuit and the rear-stage power circuit.

6. The AC-DC power converter of claim 4, wherein when the DC input voltage is less than the voltage on the energy storage capacitor, the energy storage capacitor supplies power to the rear-stage power circuit, and the front-stage power circuit does not operate or the DC input voltage supplies power to the front-stage power circuit.

7. The AC-DC power converter of claim 6, wherein the AC-DC power circuit comprises a first diode, wherein an anode of the first diode is coupled to a positive electrode of the energy storage capacitor, a cathode of the first diode is coupled to a first output terminal of the DC input voltage and the power switch.

8. The AC-DC power converter of claim 7, wherein the front-stage power circuit comprises:
a) the first magnetic component having one terminal coupled to a first terminal of the power switch, and the other terminal coupled to an anode of a second diode; and
b) the second diode having a cathode coupled to the positive electrode of the energy storage capacitor.

9. The AC-DC power converter of claim 8, wherein the rear-stage power circuit comprises:

a) a first transformer having a primary winding and a secondary winding, wherein a first terminal of the primary winding is coupled to a common node of the power switch and the first magnetic component;
b) a third diode having an anode coupled to the secondary winding of the first transformer;
c) a fourth diode having a cathode coupled to a cathode of the third diode, and an anode coupled to a reference ground of the secondary winding; and
d) a second inductor having one terminal coupled to the cathode of the fourth diode, and the other terminal coupled to the load, wherein the power switch, the first transformer, the third diode, the fourth diode, and the second inductor form a forward circuit.

10. The AC-DC power converter of claim 8, wherein the rear-stage power circuit further comprises:
a) a second magnetic component having a first terminal coupled to a common node of the power switch and the first magnetic component, and a second terminal coupled to a ground; and
b) a fifth diode having a cathode coupled to a common node of the second magnetic component and the power switch.

11. The AC-DC power converter of claim 6, wherein the front-stage power circuit comprises the first magnetic component, forming a first loop with the power switch and the DC input voltage, wherein the first magnetic component stores energy provided by the DC input voltage through the first loop.

12. The AC-DC power converter of claim 11, wherein the front-stage power circuit further comprises a sixth diode having a cathode coupled to a positive electrode of the energy storage capacitor, and an anode coupled to a ground, wherein the sixth diode is configured to provide a freewheeling loop for the first inductive inductor.

13. The AC-DC power converter of claim 12, wherein the rear-stage power circuit comprises a seventh diode and the second magnetic component, wherein a cathode of the seventh diode is coupled to the ground and an anode of the seventh diode is coupled to the second magnetic component through the load, and the seventh diode is configured to provide a freewheeling loop for the second magnetic component.

14. The AC-DC power converter of claim 13, wherein the rear-stage power circuit further comprises an eighth diode having an anode coupled to the positive electrode of the energy storage capacitor, and a cathode coupled to the power switch, wherein the eighth diode is configured to provide a loop for the second magnetic component to store energy provided by the energy storage capacitor, when the DC input voltage is less than the voltage on the energy storage capacitor.

* * * * *